(12) United States Patent
Ha et al.

(10) Patent No.: US 6,704,078 B2
(45) Date of Patent: Mar. 9, 2004

(54) LIQUID CRYSTAL DISPLAY DEVICE

(75) Inventors: Kyoung-Su Ha, Seoul (KR); Jong-Weon Moon, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 186 days.

(21) Appl. No.: 09/735,509

(22) Filed: Dec. 14, 2000

(65) Prior Publication Data

US 2002/0021389 A1 Feb. 21, 2002

(30) Foreign Application Priority Data

Dec. 31, 1999 (KR) .......................................... 1999-67847

(51) Int. Cl.$^7$ ............................................ G02F 1/1335
(52) U.S. Cl. ........................ 349/113; 349/96; 349/117
(58) Field of Search .............................. 349/113, 61, 96, 349/117

(56) References Cited

U.S. PATENT DOCUMENTS

| | | | | | |
|---|---|---|---|---|---|
| 5,659,378 | A | * | 8/1997 | Gessel | 349/96 |
| 5,995,184 | A | * | 11/1999 | Chung et al. | 349/118 |
| 6,008,871 | A | * | 12/1999 | Okumura | 349/61 |
| 6,067,138 | A | * | 5/2000 | Nishiguchi et al. | 349/117 |
| 6,130,735 | A | * | 10/2000 | Hatanaka et al. | 349/113 |
| 6,204,904 | B1 | * | 3/2001 | Tillin et al. | 349/119 |
| 6,295,109 | B1 | * | 9/2001 | Kubo et al. | 349/119 |

* cited by examiner

Primary Examiner—William I. Sikes
Assistant Examiner—Prasad R Akkapeddi
(74) Attorney, Agent, or Firm—Birch, Stewart, Kolasch & Birch, LLP

(57) ABSTRACT

The present invention discloses a liquid crystal display device having a retardation film. The retardation film is formed in such a way that one of a UV curable polymer and a UV curable liquid crystal is coated.

9 Claims, 5 Drawing Sheets

Off State

On State

LIQUID CRYSTAL DISPLAY DEVICE

CROSS REFERENCE

This application claims the benefit of Korean Patent Application No. 1999-67847, filed on Dec. 31, 2000, under 35 U.S.C. §119, the entirety of which is hereby incorporated by reference.

BACKGROUND OF THE INVENTION

1. Field of the Invention

The present invention relates to a liquid crystal display (LCD) device having a retardation film.

2. Description of Related Art

LCD devices are divided into three types: a transmissive LCD device; a reflective LCD device; and a transflective LCD device. The transmissive LCD device has a back light device as a light source, and the reflective LCD device uses ambient light instead of the back light device. The transflective LCD device has a transmissive mode and a reflective mode.

FIG. 1 is an exploded view illustrating a typical transflective LCD device. As shown in FIG. 1, the transflective LCD device 1 includes upper and lower substrates 7 and 22 with a liquid crystal layer 15 interposed therebetween. The upper substrate 7 includes a black matrix 3, a color filter 5, and a common electrode 9. The lower substrate 22 is called an array substrate and includes gate lines 21 arranged in a transverse direction and data lines 26 arranged in a longitudinal direction perpendicular to the gate line 21. A pixel region P is defined by the gate and data lines 21 and 26. A pixel electrode 18 is formed on the pixel region P. As a switching element, thin film transistors (TFTs) T are formed at a crossing point of the gate and data lines 21 and 26. The pixel electrode 18 is made of indium tin oxide (ITO) or indium zinc oxide (IZO).

FIG. 2 is a cross-sectional view illustrating a conventional reflective LCD device. As shown in FIG. 2, a lower substrate 11 includes a reflective electrode 16, and an upper substrate 13 includes a transparent electrode 17. A liquid crystal layer 19 is interposed between the lower and upper substrates 11 and 13. As the liquid crystal layer 19, twisted nematic (TN) liquid crystal is mainly used. The twisted nematic liquid crystal molecules have a molecule axis that is twisted in 90° and a phase difference of $\lambda/4$. Therefore, a linearly polarized light incident to the twisted nematic liquid crystal layer is changed into a circularly polarized light. On the upper substrate 13, a retardation film 23 (i.e., a quarter wave plate) and a polarizer 25 are arranged. Ambient light is changed into a linearly polarized light through the polarizer 25. The retardation film 23 changes the linearly polarized light into a circularly polarized light.

FIG. 3A shows light state after passing through each layer when voltage is not applied to the liquid crystal layer and assuming that the observer traces light. Incident light passes through the polarizer 25 and become a linearly polarized light parallel to the light transmission axis of the polarizer 25. The linearly polarized light is changed into a left-handed circularly polarized light after passing through the retardation film 23. The left-handed circularly polarized light is changed into the linearly polarized light after passing the TN liquid crystal layer 19. The linearly polarized light is reflected on the reflective electrode 16 and is changed into the left-handed circularly polarized light having a phase difference of $\lambda/4$ after passing through the TN liquid crystal layer 19. The left-handed circularly polarized light is changed into the linearly polarized light after passing through the retardation film 23. The linearly polarized light is parallel to a transmission axis of the polarizer 25 and thus passes through the polarizer 25, whereupon the LCD device becomes a white state.

Alternately, FIG. 3B shows light state after passing through each layer when voltage is applied to the liquid crystal layer. When the liquid crystal display device goes to an on state, the TN liquid crystal molecules that are twisted in 90° are polarized in a direction of applied electric field to have a certain direction. As shown in FIG. 3B, incident light passes through the polarizer 25 and become a linearly polarized light parallel to the light transmission axis of the polarizer 25. The linearly polarized light is changed into a left-handed circularly polarized light after passing through the retardation film 23. The left-handed circularly polarized light passes through the TN liquid crystal layer 19 "as is". The left-handed circularly polarized light is reflected on the reflective electrode 16 and is changed into the right-handed circularly polarized light. The right-handed circularly polarized light passes through the TN liquid crystal layer 19 "as is". The right-handed circularly polarized light is changed into the linearly polarized light after passing through the retardation film 23. The linearly polarized light is parallel to a transmission axis of the polarizer 25 and thus passes through the polarizer 25, whereupon the LCD device becomes a dark state.

The retardation film 23 serves to improve a viewing angle and a contrast ratio. Even though the thickness of the retardation film 23 is changed a little, error of the phase difference become greater. Further, when it is assembled to the substrate, assembly or attachment error may occur, leading to an assembling error of the polarizer.

FIG. 4 is a cross-sectional view illustrating a transflective LCD device according to the conventional art. As shown in FIG. 4, on an upper substrate 43, an upper retardation film 42 and an upper polarizer 45 are sequentially stacked. On a bottom surface of a lower substrate 53, a lower polarizer 47 and a lower retardation film 50 are arranged. A liquid crystal layer 55 are interposed between the upper and lower substrates 43 and 47. A back light device is arranged under the lower substrate 53. A reflective electrode 49 is arranged on the lower substrate 53 and includes at least one light transmitting hole 51. The light transmitting hole 51 serves to transmit light from the back light device 41.

The transflective LCD device described above requires the lower polarizer 47 as well as the upper polarizer 45. This is because light should not leak out in both a transmissive mode and a reflective mode when the transflective LCD device goes to a dark state in order to achieve a high contrast ratio.

FIG. 5A shows light state after passing through each layer in a transmissive mode when voltage is applied to the liquid crystal layer 55, and assuming that the lower retardation film 50 does not exist. As shown in FIG. 5A, light generated from the back light device 41 passes through the lower polarizer 47 and is changed into a linearly polarized light parallel to a transmission axis of the lower polarizer 47. The linearly polarized light passes through the light transmitting hole 51 and the liquid crystal layer 55 "as is". In other words, the linearly polarized light passing through the liquid crystal layer 55 has no phase difference. Then, the linearly polarized light passes through the upper retardation film 42 and is changed into left-handed circularly polarized light. The left-handed circularly polarized light passes through the upper polarizer 45. At this point, of the left-handed circularly polarized light, only elements of light parallel to a transmission axis of the upper polarizer 45 are viewed by an observer. In other words, about a half of the circularly polarized light passes through the upper polarizer 45, leading to a gray state other than a complete dark state, leading to a deterioration of contrast ratio.

FIG. 5B shows light state after passing through each layer in a transmissive mode when voltage is applied to the liquid crystal layer 55 and the lower retardation film 50 is arranged. As shown in FIG. 5B, light generated from the back light device 41 passes through the lower polarizer 47 and is changed into a linearly polarized light parallel to a transmission axis of the lower polarizer 47. The linearly polarized light passes through the lower retardation film 50 and is changed into a right-handed circularly polarized light. The right-handed circularly polarized light passes through the light transmitting hole 51 and the liquid crystal layer 55 "as is". Then, the right-handed circularly polarized light passes through the upper retardation film 42 and is changed into a linearly polarized light perpendicular to a transmission axis of the upper polarizer 45. The linearly polarized light is absorbed into the upper polarizer 45, leading to a dark state.

In the transmissive mode of the transflective LCD device, light D generated from the back light device 41 passes through the light transmitting hole 51 and reaches the liquid crystal layer 55. However, part C of light generated from the back light device 41 is reflected on the reflective electrode 49 and then is absorbed into the lower polarizer 47. Or a small amount of light is reflected on the reflective electrode 49 and then directs toward the liquid crystal layer 55 through the light transmitting hole 51.

FIG. 6 shows a state of light C reflected on the reflective electrode in a transmissive mode. As shown in FIG. 6, light C from the back light device 41 passes through the lower polarizer 47 and is changed into a linearly polarized light parallel to a transmission axis of the lower polarizer 47. The linearly polarized light is changed into a left-handed circularly polarized light through the retardation film 50 that is a λ/4 plate. The left-handed circularly polarized light is reflected on the reflective electrode 49 and is changed into a right-handed circularly polarized light. The right-handed circularly polarized light passes through the lower retardation film 50 and is changed into the linearly polarized light perpendicular to a transmission axis of the lower polarizer 47. The linearly polarized light is all absorbed into the lower polarizer 47. Therefore, the lower retardation film 50 causes light lose in the transmissive mode of the transflective LCD device, whereupon a brightness may be lowered.

SUMMARY OF THE INVENTION

To overcome the problems described above, preferred embodiments of the present invention provide a reflective liquid crystal display (LCD) device having the assembly improvement of a retardation film.

It is another object of the present invention to provide a transflective LCD device having a high brightness and an excellent color purity.

In order to achieve the above object, the preferred embodiments of the present invention provide a reflective liquid crystal display device, including: a first substrate having a reflective electrode on a bottom surface thereof, a second substrate having a polarizer and a retardation film, the polarizer formed on a top surface of the second substrate, the retardation film formed on a bottom surface of the second substrate; and a liquid crystal layer interposed between the first and second substrates, wherein the retardation film is made of one of a polymer and a liquid crystal.

The preferred embodiment of the present invention further provides a transflective liquid crystal display, including: a liquid crystal panel including a) a first substrate having a first polarizer and a reflective electrode, the first polarizer formed a bottom surface thereof, the reflective electrode having at least one light transmitting hole and a first retardation film, the first retardation film formed in the light transmitting hole, the light transmitting hole transmitting light; b) a second substrate having a second retardation film and a second polarizer sequentially arranged thereon; and c) a liquid crystal layer interposed between the first and second substrates; and a back light device for generating light.

The preferred embodiment of the present invention further provides a liquid crystal display device, including: a liquid crystal panel including: a) an upper substrate having an upper polarizer and an upper retardation film sequentially arranged on a top surface thereof; b) a lower substrate having a reflective electrode and a first lower retardation film sequentially arranged on a top surface thereof and a second lower retardation film and a lower polarizer sequentially arranged on a bottom surface thereof, the reflective electrode and the first lower retardation film having a light transmitting hole, the light transmitting hole transmitting light; and c) a liquid crystal layer interposed between the upper and lower substrates; and a back light device providing light to the liquid crystal panel.

The retardation film is made of either of an UV curable polymer and an UV curable liquid crystal.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFERRED EMBODIMENTS

Reference will now be made in detail to preferred embodiments of the present invention, example of which is illustrated in the accompanying drawings.

Figure 1:
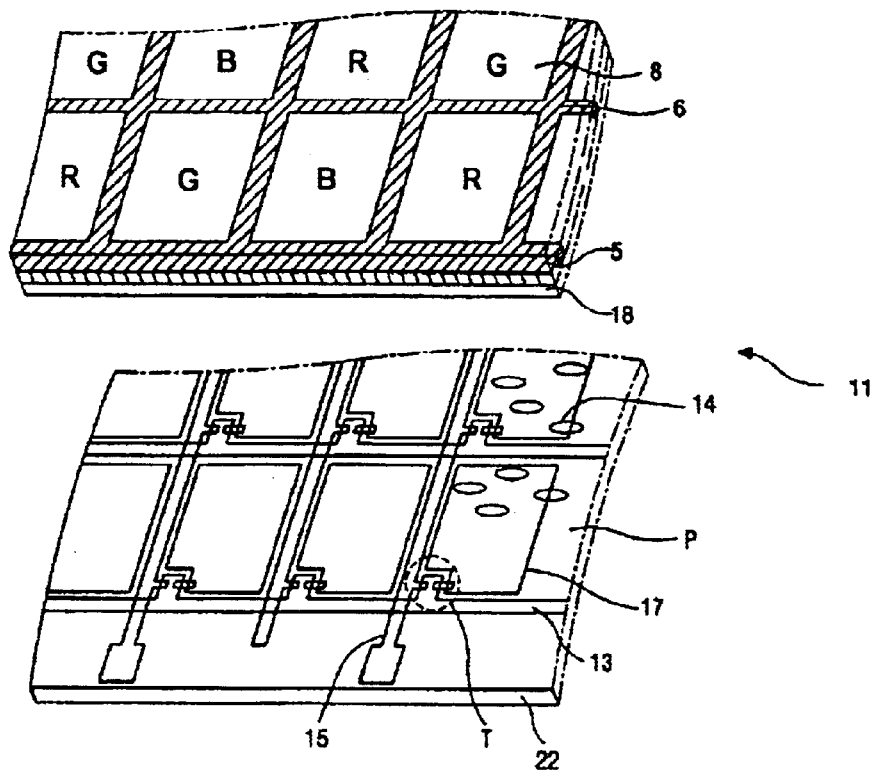
FIG. 1 is an exploded view illustrating a typical transflective LCD device.
Figure 2:
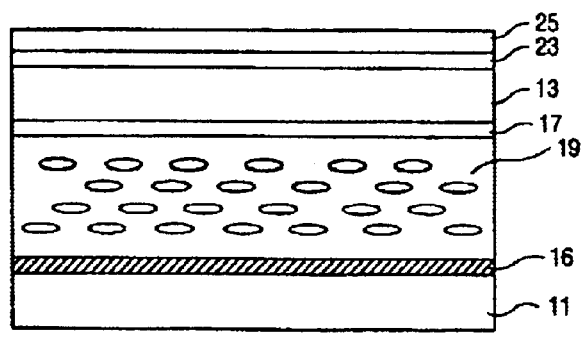
FIG. 2 is a cross-sectional view illustrating a conventional LCD device.
Figure 3A:
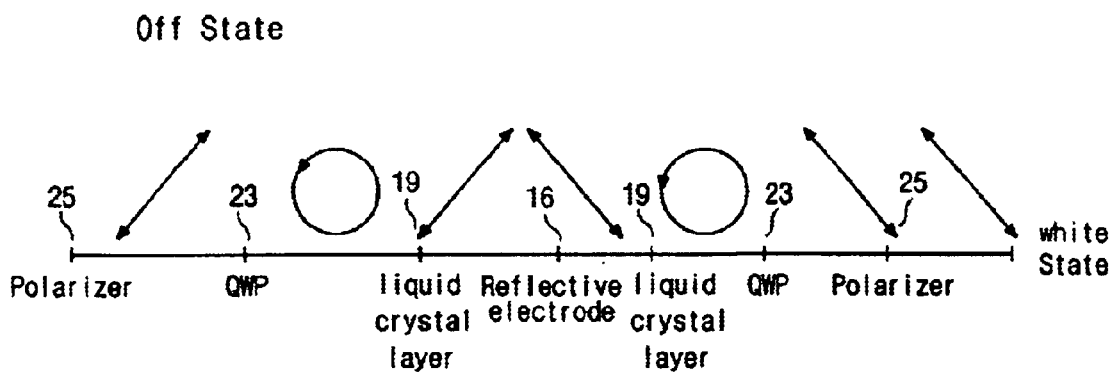
FIG. 3A shows light state after passing through each layer when voltage is not applied to a liquid crystal layer.
Figure 3B:
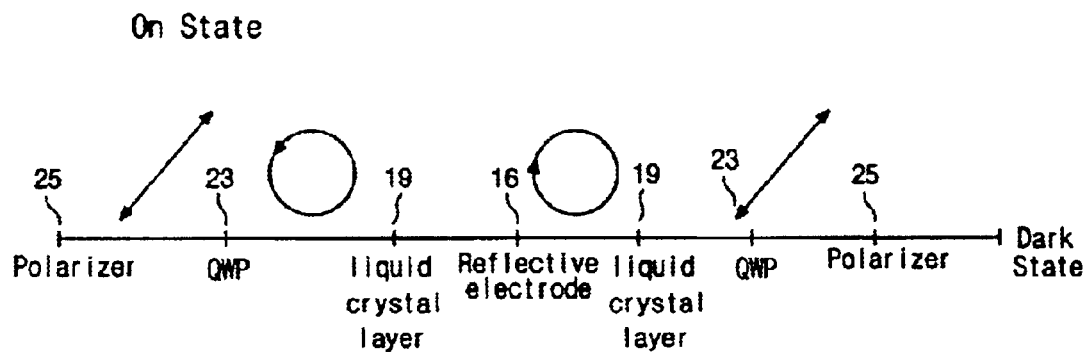
FIG. 3B shows light state after passing through each layer when voltage is applied to the liquid crystal layer.
Figure 4:
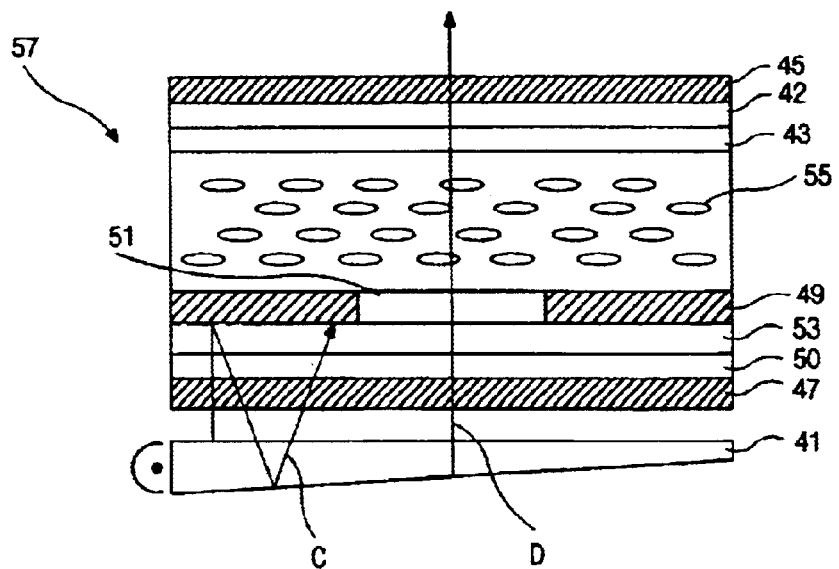
FIG. 4 is a cross-sectional view illustrating a transflective LCD device according to a conventional art.
Figure 5A:
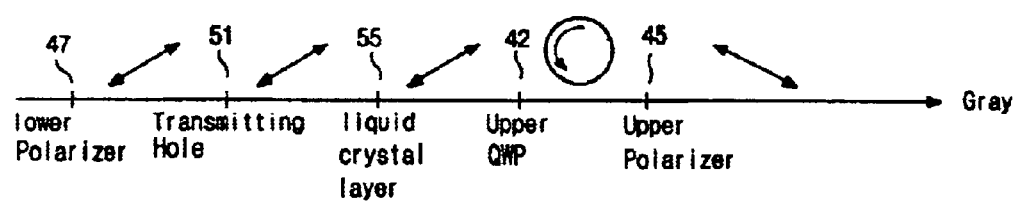
FIG. 5A shows light state after passing through each layer in a transmissive mode when voltage is applied to the liquid crystal layer and a lower retardation film is not arranged.
Figure 5B:
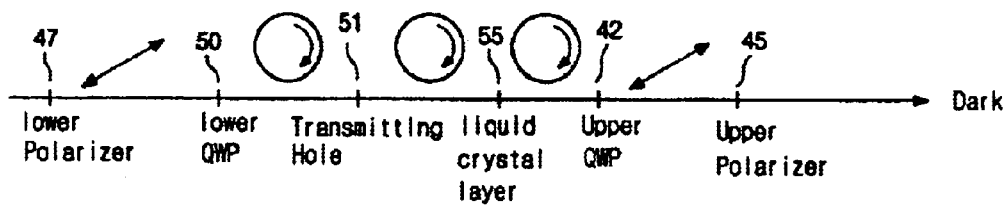
FIG. 5B shows light state after passing through each layer in a transmissive mode when voltage is applied to the liquid crystal layer and the lower retardation film 50 is arranged.
Figure 6:
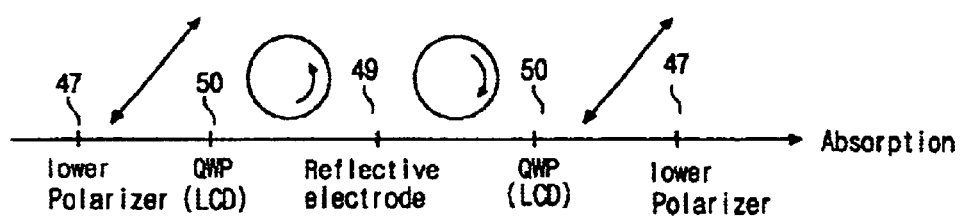
FIG. 6 shows a state of light reflected on the reflective electrode in a transmissive mode.
Figure 7:
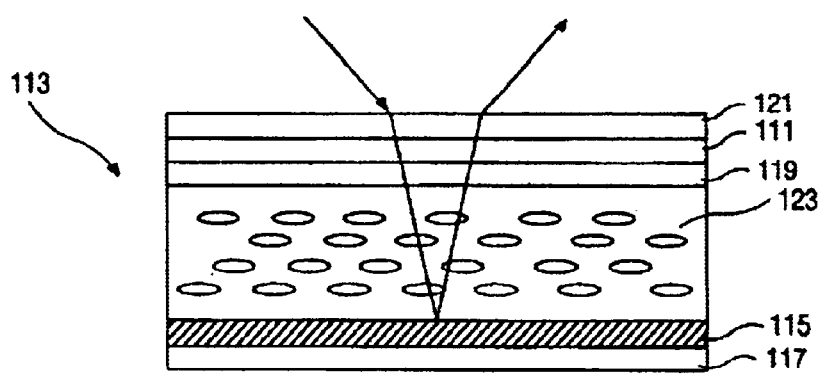
FIG. 7 is a cross-sectional view illustrating a reflective liquid crystal display device according to a first preferred embodiment of the present invention.

FIG. 7 is a cross-sectional view illustrating a reflective liquid crystal display (LCD) device according to a first preferred embodiment of the present invention. As shown in FIG. 7, the reflective LCD device 113 includes lower and upper substrates 117 and 111 with a liquid crystal layer 123 interposed therebetween. The lower substrate 117 includes a reflective electrode 115, and the upper substrate 111 includes a retardation film 119 and a polarizer 121. The retardation film 119 is formed in such a way that the UV curable polymer is coated on a bottom surface of the second substrate 111 and then is hardened by an ultraviolet ray.

The method of forming the retardation 119 according to the first preferred embodiment of the present invention is easy in coating of a uniform thickness and can reduce an assembly error. Further, the method can achieve a lightweight, thin LCD device. Furthermore, compared with the conventional method that the retardation film is attached on the top surface of the substrate, since causes to lower light utilization efficiency such as a reflection and an absorption of light can be reduced, the reflective LCD device having a high brightness can be manufactured.

Figure 8:
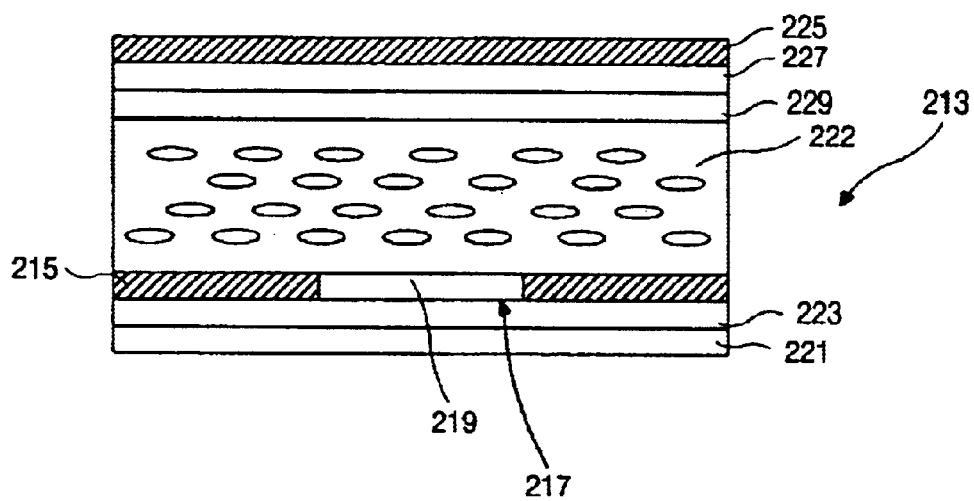
FIG. 8 is a transflective LCD device according to a second preferred embodiment of the present invention.

FIG. 8 is a transflective LCD device according to a second preferred embodiment of the present invention. As shown in FIG. 8, the transflective LCD device 213 includes lower and upper substrates 223 and 229 with a liquid crystal layer 222 interposed therebetween. The lower substrate 223 includes a lower polarizer 221 on its bottom surface and a reflective electrode 215 having a light transmitting hole 217. At this point, a retardation film 219 is formed in the light transmitting hole 217. The upper substrate 229 includes an upper polarizer 225 and an upper retardation film 227, which are sequentially stacked on its top surface. The upper retardation film 227 may be formed on a bottom surface of the upper substrate 229 other than the top surface of the upper substrate 229. Even though not shown, the transflective LCD device 213 further includes a back light device.

The retardation film 219 is formed by the following method. First, the UV curable polymer is coated on the reflective electrode 215 and then only a portion of the UV curable polymer layer corresponding to the light transmitting hole 217 is hardened by an ultraviolet ray. Then, a portion of the UV curable polymer layer that is hardened by an ultraviolet ray is removed by a solvent, an organic material or the like. At this point, the polymer is preferably a UV curable polymer.

The transflective LCD device 213 according to the second preferred embodiment of the present invention has an advantage that light that passes through the lower polarizer 221 and then is reflected on the reflective electrode 215 can return to the back light device (not shown), whereupon a brightness can be as improved as more than 25%. Further, in case that the retardation film 219 formed in the light transmitting hole 217 is employed in a color transflective LCD device, if a thickness of the retardation film 219 varies according to a color of each pixel to meet a waveband of each color or if the retardation film 219 is formed using a liquid crystal having different Δn, the retardation film can be formed that provides light having different color with the same phase difference. Furthermore, a weight and a thickness of the transflective LCD device can be as reduced as separate retardation film.

Figure 9:
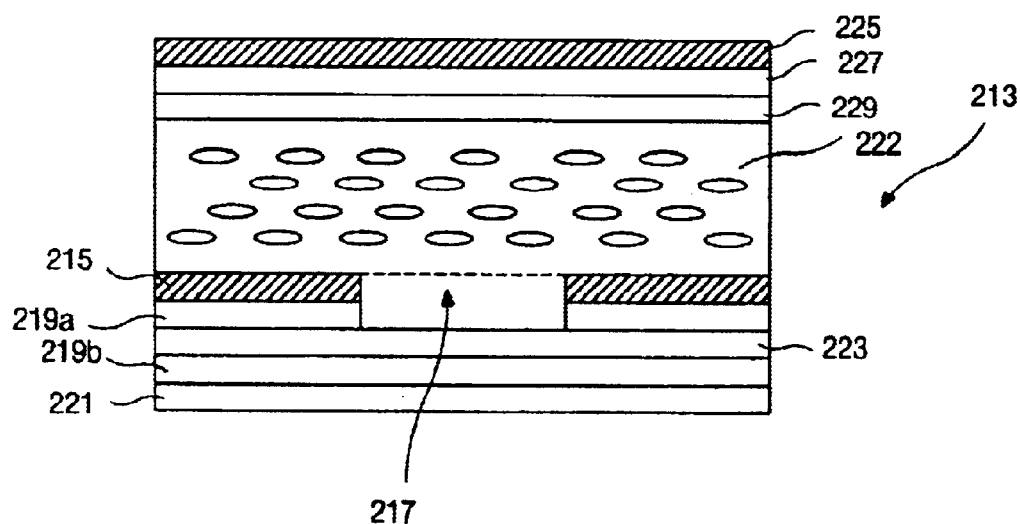
FIG. 9 is a transflective LCD device according to a third preferred embodiment of the present invention.

FIG. 9 is a transflective LCD device according to a third preferred embodiment of the present invention. As shown in FIG. 9, the transflective LCD device 213 includes lower and upper substrates 223 and 229 with a liquid crystal layer 222 interposed therebetween.

The lower substrate 223 includes a reflective electrode 215, first and second lower retardation films 219a and 219b, and a lower polarizer. The reflective electrode 215 and the first lower retardation film 219a are sequentially formed on a top surface of the lower substrate 223 and include a light transmitting hole 217 of the same size as each other. The second lower retardation film 219b and the lower polarizer 221 are sequentially formed on a bottom surface of the lower substrate 223. The upper substrate 229 includes an upper polarizer 225 and an upper retardation film 227, which are sequentially stacked on its top surface. The upper retardation film 227 may be formed on a bottom surface of the upper substrate 229 other than the top surface of the upper substrate 229. Even though not shown, the transflective LCD device 213 further includes a back light device.

The first lower retardation film 219a is formed such a way that a UV curable polymer or a UV curable liquid crystal is coated on the lower substrate 223 and is patterned through a mask process.

The first lower retardation film 219a has a phase opposite to the second lower retardation film 219b. Therefore, a phase of light reflected on the retardation film can not vary, like the second preferred embodiment of the present invention, light reflected on the reflective electrode 215 can direct toward the back light device. The transflective LCD device 213 can have high color purity and high brightness.

As described herein before, according to the preferred embodiments of the present invention, the reflective LCD having a reduced assembly error and having a high brightness can be manufactured. Further, the transflective LCD device according to the preferred embodiments of the present invention has high color purity and high brightness. Furthermore, the LCD device according to the preferred embodiments of the present invention is light in weight and thin in thickness.

While the invention has been particularly shown and described with reference to first preferred embodiments thereof, it will be understood by those skilled in the art that the foregoing and other changes in form and details may be made therein without departing from the spirit and scope of the invention.

What is claimed is:

1. A transflective liquid crystal display, comprising:
   a liquid crystal panel including:
   a) a first substrate having a first polarizer and a reflective electrode, the first polarizer formed on a second surface thereof, the reflective electrode having at least one light transmitting hole and a first retardation film on a first surface thereof, the first retardation film formed in the light transmitting hole, the light transmitting hole transmitting light;
   b) a second substrate having a second retardation film and a second polarizer sequentially arranged on a second surface thereof; and
   c) a liquid crystal layer interposed between the first surface of the first substrate and the first surface of the second substrate, and a back light device for generating light.

2. A liquid crystal display device, comprising:
   a liquid crystal panel including:
   a) an upper substrate having an upper polarizer and an upper retardation film sequentially arranged on a second surface thereof;
   b) a lower substrate having a reflective electrode and a first lower retardation film sequentially arranged on a first surface thereof and a second lower retardation film and a lower polarizer sequentially arranged on a second surface thereof, the reflective electrode and the first lower retardation film having a light transmitting hole, the light transmitting hole transmitting light; and c) a liquid crystal layer interposed between a first surface of the upper substrate and the first surface of the lower substrate; and a back light device providing light to the liquid crystal panel.

3. The liquid crystal display device of claim 2, wherein the first lower retardation film is made of either of a UV curable polymer or a UV curable liquid crystal.

4. A transflective LCD device, comprising:

a first polarizer;

a first substrate over the first polarizer;

a reflector having a transmitting portion over the first substrate;

a retardation layer formed in the transmitting portion of the reflector and contacting the reflector;

a liquid crystal layer over the reflector;

a second substrate over the liquid crystal layer;

an upper retardation film positioned over or under the second substrate; and a second polarizer over the upper retardation film.

5. The device of claim 4, wherein the retardation layer is on the transmitting portion of the reflector.

6. The device of claim 4, wherein the retardation layer is comprised of UV curable polymer or UV curable liquid crystal.

7. A transflective liquid crystal display device, comprising:

first and second substrates facing and spaced apart from each other;

a first retardation film on an outer surface of the first substrate;

a first polarizer on the first retardation film;

a reflective electrode on an inner surface of the second substrate, the reflective electrode having at least one light transmitting hole;

a second retardation film formed in the at least one light transmitting hole;

a second polarizer on an outer surface of the second substrate; and a liquid crystal layer interposed between the first substrate and the reflective electrode.

8. A transflective liquid crystal display device, comprising:

first and second substrates facing and spaced apart from each other;

a first retardation film on an outer surface of the first substrate;

a first polarizer on the first retardation film;

a second retardation film on an inner surface of the second substrate, the second retardation film having at least one light transmitting hole;

a reflective electrode on the second retardation film, the reflective electrode having the at least one light transmitting hole in common with the second retardation film;

a third retardation film formed in an outer surface of the second substrate;

a second polarizer on the third retardation film; and a liquid crystal layer interposed between the first substrate and the reflective electrode.

9. The device according to claim 8, wherein an optical axis of the second retardation film is perpendicular to that of the third retardation film.

* * * * *